May 19, 1953        V. P. HARVEY        2,638,724
METHOD OF AND APPARATUS FOR SEALING WRAPPERS

Filed Dec. 18, 1946                              4 Sheets-Sheet 1

Inventor
V. P. Harvey
By Watson, Cole, Grindle & Watson

May 19, 1953 V. P. HARVEY 2,638,724
METHOD OF AND APPARATUS FOR SEALING WRAPPERS
Filed Dec. 18, 1946 4 Sheets-Sheet 4

Inventor
V. P. Harvey
By Watson, Cole, Grindle & Watson

Patented May 19, 1953

2,638,724

UNITED STATES PATENT OFFICE 2,638,724

METHOD OF AND APPARATUS FOR SEALING WRAPPERS

Valentine Pearce Harvey, Deptford, London, England, assignor to Molins Machine Company Limited, Deptford, London, England Application December 18, 1946, Serial No. 716,947
In Great Britain December 19, 1945

11 Claims. (Cl. 53—14)

This invention concerns an improved method of sealing wrappers and apparatus therefor, and refers particularly to wrappers made from material having heat-sealing properties and of such nature that the application of heat tends to increase the permeability of the material. Materials of this kind include, for example, lacquered regenerated cellulose, the material sold under the Registered Trade-Mark "Pliofilm" and numerous cellulose derivatives either intrinsically heat-sealing or coated with heat-sealing material and, for brevity, all such materials will be referred to hereafter as "heat-sealing materials".

Such wrappers are frequently used as protective wrappers for packages containing goods or materials which it is desirable to maintain as far as possible free from changes in moisture content. Heat-sealing materials have been produced which possess a relatively low degree of permeability to moisture vapour, and are in this and in other respects suitable for use in making such protective wrappers. It is clear, however, that the protective value of such wrapper depends not only upon the quality of the wrapping material itself but also upon the way in which it is wrapped and secured about the package.

Wrappers made of heat-sealing material are secured and sealed by applying heat to those parts of the wrappers which overlap other parts, so as to fuse together the overlapping parts. It is found, however, that when heat-sealing material is heated to the extent necessary to effect a satisfactory seal, the permeability of the part of the material to which the heat is applied is substantially doubled. This increase in permeability applies equally to the underlying portion of material in a case where two thicknesses of material are fused together, and consequently, the resulting permeability of the two thicknesses of material is about equal to, or slightly greater than, that of a single thickness.

Since the effectiveness of the seal is reduced by any increase in the permeability of the wrapping material in the neighbourhood of the seal, it is desirable to avoid as far as possible any such increase due to the application of heat.

According to the present invention there is provided a method of sealing a wrapper made from heat-sealing material, wherein heat is applied by means of a heated element to overlapping portions of the wrapper over an area smaller (e. g. narrower) than the overlap, for the purpose specified.

The purpose specified is to arrange that the overlapping portions of the packet shall be sealed by the application of heat, and to ensure that the general permeability of the wrapper as a whole is not seriously affected by the heat sealing. For example, as will be apparent from reading the specific description hereinafter, in one construction the packets are sealed by bars which extend lengthwise of the folded portions and by other bars which extend transversely to such first said bars, the said transverse portions extending across the whole depth of the packet. In such a case, of course, it will be appreciated there may be small areas where the heated bar engages only a single thickness of material due to difficulties in folding which are discussed later, and naturally the permeability of such small areas of the wrapper is consequently increased. However, owing to the relative smallness of the areas whose permeability is so increased, the total effective permeability of the packet is not seriously impaired.

Further according to the present invention there is provided a method of sealing a wrapper made from heat-sealing material wherein overlapping portions of the wrapper are sealed by the application of heat by means of relatively narrow striplike elements whereby the heated portion of the wrapper in relation to the total surface of the wrapper to be sealed is relatively small.

In the case of wrappers applied to articles comprising flat sides such as articles of rectangular block shape there are often seams comprising two overlapping folds from opposite faces of the article and a further fold from a side which extends at right angles to said faces, and in these cases the heated element is applied to the wrapping material substantially only over areas where a double or treble thickness of material occurs by reason of said folding.

More specifically in the case of an article (e. g. a cigarette packet) of thin rectangular block shape enclosed in a wrapper of the kind known as block-ended, the heated element is applied to the wrapping material over an area along the length of each narrow side face extending to the top edge of each said face (i. e. the edge adjacent the top face of the packet), and across the width of each narrow side face substantially only over areas where the side folds overlap one another and also lie over the end tucks.

Further according to the present invention there is provided a method of sealing wrappers made from heat-sealing material, wherein articles (e. g. packets) enclosed in wrappers are arranged in a stack with overlapping portions of the wrappers lying on faces of the articles which form sides of the stack, said stack being intermittently moved past one or more movable heated elements each comprising at least one relatively narrow strip-like heating surface arranged intermittently to move into contact with wrappers to seal overlapping portions thereof over relatively small areas while the stack is stationary, and thereafter to move away so as to be out of contact with wrappers while the stack is moving.

Each heated element may comprise a plurality of parallel narrow strip-like heated surfaces (e. g. bars) arranged to register simultaneously with a plurality of articles in the stack so that the wrapper of each said article is engaged by different (e. g. each of) said heated surfaces in succession. The heated element may also comprise heated surfaces to engage simultaneously the wrappers of a plurality of articles in the stack.

The heated surfaces may be spaced apart by appropriate distances in relation to the dimensions of the articles in the stack and the distance through which the stack is moved at each movement so as to enable the heated surfaces to engage substantially the same parts of each wrapper in succession.

It will be understood that in practice slight variations may sometimes occur in the dimensions of the articles being wrapped, and such variations may at times disturb the exact register between the heated surfaces and the wrapped articles in the stack. For example, the articles themselves may not always be made absolutely exactly the same size. These slight variations may cause the stack occasionally to be displaced either in the direction of its movement or otherwise, relative to the disposition of the heated elements. Any such accidental departures from correct register are, however, minimized by the fact that the stack according to the present invention is a relatively short one, so that relatively few articles are passing the heated elements at any one time. Thus the cumulative effect of slight variations is not very serious, although any variation from the desired register is, of course, to be avoided as far as practicable.

The expression "stack" when used herein shall be taken to mean a group or batch of similarly oriented contiguous articles arranged in substantial alignment with one another. For example, a stack of cigarette packets may have the packets resting on one another or arranged side by side. The expression "stack" when used herein is to be deemed to include the arrangement in any direction, such as horizontal or inclined, and is not to be deemed to be limited to the articles forming a vertical stack.

It is sometimes desired to wrap articles so that one overlapping portion of wrapping material extends from an edge of the article to form a tab or flap. This is sometimes done, for example, when packets of cigarettes are wrapped in outer wrappers of cellulosic material, since the extending flap, being easily grasped, makes it easier to remove the outer wrapper.

When articles are wrapped in this manner in wrappers made from heat-sealing material they may in the process of wrapping be arranged for sealing in a stack with the extending flap of each wrapper covering or overlying part of a face of an adjacent article in the stack. In such a case the wrappers may be sealed by the method according to the present invention by so arranging the heated element or elements and the extending flap that each heated surface registers with a part of a wrapper which is not covered by the extending flap of an adjacent article, so that such extending flaps are not engaged by the heated element or elements.

The invention will be more fully described with reference to the accompanying drawings in which—

Figure 6 is a perspective view of a heater shown in Figure 3.

Figure 1:
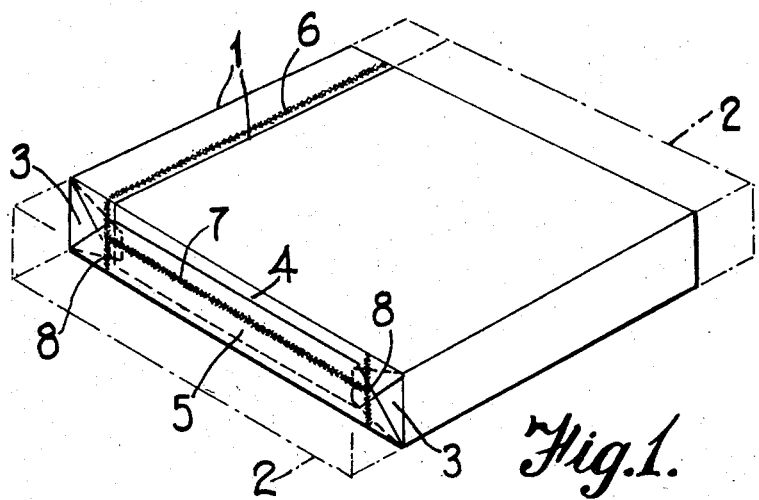
Figure 1 is a perspective view of a cigarette packet enclosed in a wrapper sealed according to the invention.

Referring first to Figure 1 of the drawing, one way of carrying the invention into effect will be described by way of example with reference to the sealing of the outer wrapper of a block-shaped cigarette packet having two opposite broad side faces, top and bottom narrow faces, and two opposite narrow side faces. The style of wrapping shown is well known, and it does not seem necessary to illustrate the stages of the wrapping operations. The blank from which the wrapper is formed which is made of heat-sealing material, is folded around the two broad side faces and the top and bottom narrow faces of the packet to form a tube, the overlapping ends of the blank lying on the top face of the packet at 1 and being secured together in a manner to be described later, before further folding operations take place.

At this stage the wrapping material comprising the tube projects beyond the two narrow side faces of the packet as indicated by the chain lines 2 for a distance sufficient to form the closure folds. The projecting ends of the tube are then folded down in the well known manner by first forming end tucks 3 by bending down the portions of the tube lying in the planes of the top and bottom faces of the packet, after which the other two portions of the ends of the tube 4 and 5 are folded down in turn and secured.

The sealing of the overlapping portions of the wrapper 1 which lie on the top face of the packet is effected by applying a heater to those portions of the wrapper which it is desired to fuse with their underlying portions. This operation may be carried out by supporting the projecting ends in any suitable manner, but where the overlap 1 occurs at the position shown, the sealing of the projecting ends of the tube may be effected after wrapping is completed as explained later.

Since it is desirable, in order to avoid undue increase in the permeability of the wrapping material, to apply heat over as small an area of wrapper as is consistent with the effective sealing of the wrapper, the heating element of the heater is made narrow or strip-like, for example about 2 or 3 millimetres wide, but in any case narrower than the overlapping portion of material which is to be secured.

The application of the narrow heated element fuses together a narrow strip, shown by cross-hatching 6, of the overlapping and underlying portions along the length of the top face of the packet.

The end tucks and side folds are then formed on the narrow side faces of the packet. Sealing thereof is effected by applying a heated element first along the overlapping side folds, so as to fuse together a narrow strip 7 of the overlapping and underlying material along the length of each narrow side face of the packet, and then across the end tucks so as to fuse together strips 8 transverse to the fused strip already formed on each narrow side face. The fusing of one strip 8 also fuses that part of the seam of the overlap 1 which now lies on the side of the packet.

The fused strip 7 running along the length of each narrow side face extends along substantially the whole length of the overlapping part of the side folds, and in order to complete the seal the transverse fused strips 8 extend across the whole width of each side face and are joined to the ends of the lengthwise strip.

In cases where the sealing operations are performed while the packet is stationary, any desired form of heater may be used, provided that the heating element itself is sufficiently narrow. When it is desired to seal the packet while it is moving, it is found that a heater suitable for this purpose is the heater disclosed in British patent specification No. 528,784 or that disclosed in British patent specification No. 528,785. These specifications describe heaters comprising movably mounted metal bands adapted to be heated, for example by an electric resistance heater or by the bands themselves comprising electric resistance heaters. Either of these heaters is particularly suitable for use when the wrappers are to be sealed while the wrapped packets are in motion, since it is important, when applying heat to heat-sealing material, to avoid relative movement between the material and the heater, as rubbing contacts under heated conditions rapidly increase the permeability of the material as well as causing building up of dross on the heater, thus necessitating frequent cleaning. The application of such heaters to the sealing of the packet is obvious, as it is only necessary to move the packet by a conveyor at the same speed as the heated metal band travels.

A suitable temperature for the heated element is about 130° F., and a suitable length of time for the heated element at that temperature to be kept in contact with the wrapping material is found to be four seconds.

It will be appreciated that more than one heated element may be used, and that heated elements may be applied to the wrappers in various ways, according to the particular method in which it is desired to handle the packets. For example, a number of heaters, or a single heater comprising a plurality of heating elements, may be used. A suitable method of effecting the fusing of the transverse strips on the narrow side faces of packets is to arrange a number of packets in a batch side by side with the broad faces of adjacent packets against each other, and to apply a heated element across the entire batch so as to fuse a transverse strip on a narrow side face of each packet. Two heated elements may be used simultaneously when this method is used, so as to fuse a transverse strip at each end of the lengthwise strips in the one operation. An arrangement of this nature is described with reference to Figures 3 to 6. All the sealing operations may if desired be performed while the packets are stationary, or alternatively while they are moving; or it may be found convenient for some of the operations to be performed while the packets are stationary and others while they are moving. In all cases where heat is applied to the wrapping material while a packet is moving, however, the heated element should move with the packet so as to avoid relative movement between the heated element and the wrapping material while they are in contact with each other. In the cases where heat sealing is effected while the packet is stationary, the heated element should be stationary during the actual sealing operation. The heated element may of course be moved laterally towards and away from the wrapping material respectively before and after the sealing operation.

Figures 7, 8:
Figures 7 and 8 are diagrams showing modifications to the wrapper seams.

In an alternative arrangement shown in Figure 7 an extra thickness of material may be used, so that three thicknesses instead of two are fused together. The permeability of this threefold thickness when fused together would be less than that of a single unheated thickness. The extra thickness is obtained by folding back a narrow piece 14 of the wrapper at the overlap; or, as shown in Figure 8, an extra strip 15 is inserted and this may also be used as a tear strip.

Figure 2:
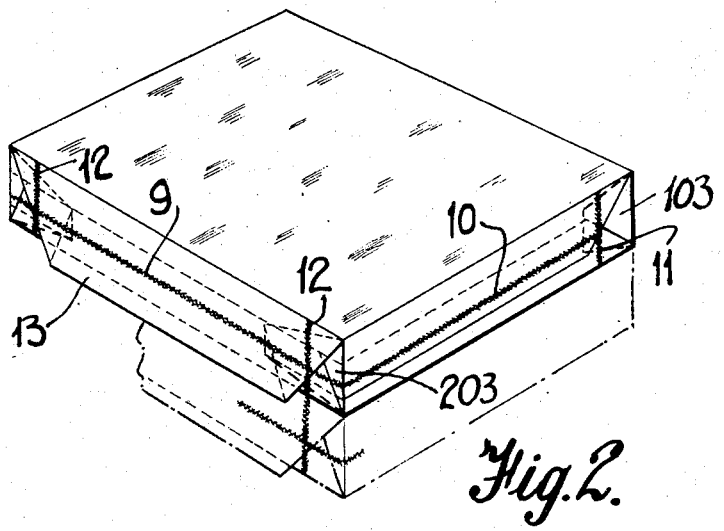
Figure 2 is a perspective view of a packet wrapped in a slightly different manner, with a portion of another packet shown beneath it.

Referring to Figure 2, a narrow or strip-like heated element is applied along the length of the top face of the packet, fusing together a narrow strip 9 of the overlapping and underlying portions of material thereon. In this block-ended form of wrapping the end tucks and side folds are sealed on the line 10 by a narrow heated element applied along each narrow side and another is applied across the end tucks at 11, so as to fuse together narrow strips of overlapping and underlying material lengthwise and across the narrow side faces.

The portions of material forming the end tucks lie against the narrow side faces of the packet, and are therefore partly overlapped by the side folds when the latter are themselves folded down on to the narrow side faces. The end tucks on the top face of the packet are also formed from overlapped portions of material, and it is desirable that no unsealed gaps should be left between these overlapped portions, or between the end tucks and the side folds which partially overlap them, since any such gaps may afford passage to moisture vapour.

Thus a heated element is applied along the whole length of the top of the packet on the line 9, and transverse strips 12 are also sealed. In this way the overlapping portions of the end tucks at the top of the packet are sealed together so as to leave no gaps between them. Preferably, however, the heated element is not applied directly to the end tucks at the other end of the packet beyond the line 11, since these do not comprise overlapping portions and hence no useful purpose is served by applying heat to them; on the contrary, their permeability would be increased.

It is often the practice to include tearing strips in wrappings of the kind above described, as many of the materials used are extremely thin and difficult to remove and in all such cases where such strips are joined by heat-sealing to the wrapper, the sealing is carried out over the smallest possible area in accordance with the invention.

It will be known to those skilled in the art that the shape and size of end tucks such as those shown in Figure 1 at 3 and in Figure 2 at 103 and 203 may vary considerably according to the opinion of the person making them, in the case of manual wrapping, or according to the shape and timing of the tuckers on an automatic machine. They are illustrated as rapidly tapering for clearness, but in general it is desirable to make them as nearly as possible with parallel sides, for example about 2 millimetres narrower at their free ends than the packet width. However, since they must taper a little, there will be parts of the sealing lines 8, 11 and 12 which extend over a single thickness of wrapper. It is not desirable to attempt to shorten said sealing lines to the exact width of the tuck at this part, since tucks in a series of packets inevitably vary slightly in size or may be displaced slightly, and it is more serious to have part of the seam unsealed (which would afford a direct passage or "pipe" to moisture) than to impair the resistance to moisture of the small areas of the sealing lines 8, 11 and 12 between the tucks and the packet edges. These facts should be borne in mind when reading the description and claims, as the object is complete sealing of the seams with as little detriment to the rest of the wrapper as is physically possible.

In the automatic wrapping of such packets the packets are placed in the hopper of a wrapping machine and are fed in succession through mechanism which wraps them in heat-sealing material, and the heat sealing devices of such a machine will now be described with reference to Figures 3 to 6. These figures show only sufficient detail for the understanding of the present invention.

The wrapper shown in Figure 2 is so dimensioned that the upper of the overlapping portions on the top face extends beyond the edge of the packet to form an extending tab or flap 13 in the well-known manner.

When the wrappers have been formed about the packets in this manner, the wrapped packets are moved successively into a vertical stacker indicated generally by the reference 20 in which they are arranged with their broad side faces resting on one another. The packets are moved intermittently upwardly in the stacker by a reciprocating platform 21.

Three electrically heated members 22, 23 and 24 respectively form the heating elements of the stacker and are arranged to apply heat to parts of the faces of the packets on which portions of wrapping material overlap. Each of the three members is provided with a number of strip-like heating elements such as narrow outstanding ridges or bars 25 and 26 formed integrally therewith and having flat heating surfaces. These narrow bars are so located as to register with the parts of the faces of the packets at which it is desired to seal or fuse together the overlapping portions of wrapping material. A number of the bars, i. e., the bars 25, are parallel and substantially horizontal, and the transverse bars 26 lie across the horizontal bars at right angles to them. The horizontal bars are for the purpose of sealing strips of wrapping material along the lengths of the packet faces to form the seals 9 and 10, Figure 2, while the transverse bars are to seal the transverse strips 11 and 12 across said faces so as to complete the sealing of a wrapper.

The heated members are arranged to be moved inwardly and outwardly by automatic mechanism described below and operating in timed relationship with the intermittent upward movement of the stack, so that they move in to engage the wrappers and then move away again while the stack is stationary.

The platform 21 is supported on parallel levers 27 and 28 pivoted at 29 and 30 respectively to the machine frame 31. The lever 27 is of T shape and to one arm there is pivoted a link 32 while the other has a cam roller 33 on it. The lever 27 has a further cam roller at 34. On a driving shaft 35 there are mounted two cams 36 and 37 respectively which engage with the rollers 33 and 34 and effect positive up and down movements of the platform 21.

The link 32 is pivoted to a lever 38 pivoted at 39 to a bracket 40 fixed to the machine frame. A parallel link 41 is pivoted to the bracket at 42 and the link and lever together support and operate a wall 43 of the stacker.

The heaters 22 and 24 are supported on levers 44 pivoted to a bracket 45 fixed to the machine frame and have rollers 46 attached thereto which engage cams 47 mounted on vertical spindles 48 driven in timed relationship with the shaft 35. The heater 23 is fixed to a slide 49 which reciprocates on a fixed guide 50 under the action of a cam 51 which engages a roller 52 and a compression spring 53.

This arrangement permits the stack of packets to be moved up while the heating surfaces and the wall 43 are out of contact with the wrappers.

The bars are so located and dimensioned and spaced apart as to register with and engage the overlapping portions of wrapping material over areas smaller (e. g. narrower) than the respective overlaps. In order to avoid sealing the extending flap 13 of one packet to the wrapper of an adjacent packet, the bars 25 of the heated member 23 facing the top faces of the packets are located so as to register and engage only with parts of said faces which are not covered or overlapped by flaps extending from adjacent packets, see Figure 2 where it will be seen that the flap 13 of the upper packet is clear of the seam 9 of the lower one. The heater 23 is provided with brushes 54, Figure 6, for the purpose of resiliently pressing the overlapping flap of a wrapper against the side of the stack so as to keep it in place.

As the stack of packets moves intermittently upwards the heated members move in whenever the stack is stationary and then move away before it rises a further step. Each time the heated members move inwardly, each of the bars 25 and 26 presses against part of a wrapper on a narrow face of each packet and heats a narrow strip of overlapping wrapping material. It will thus be seen that each wrapper is subjected to a series of sealing operations at it passes up between the heated members, and that the bars 26 fuse the transverse strips of a number of packets at once in the manner previously mentioned.

Figure 3:
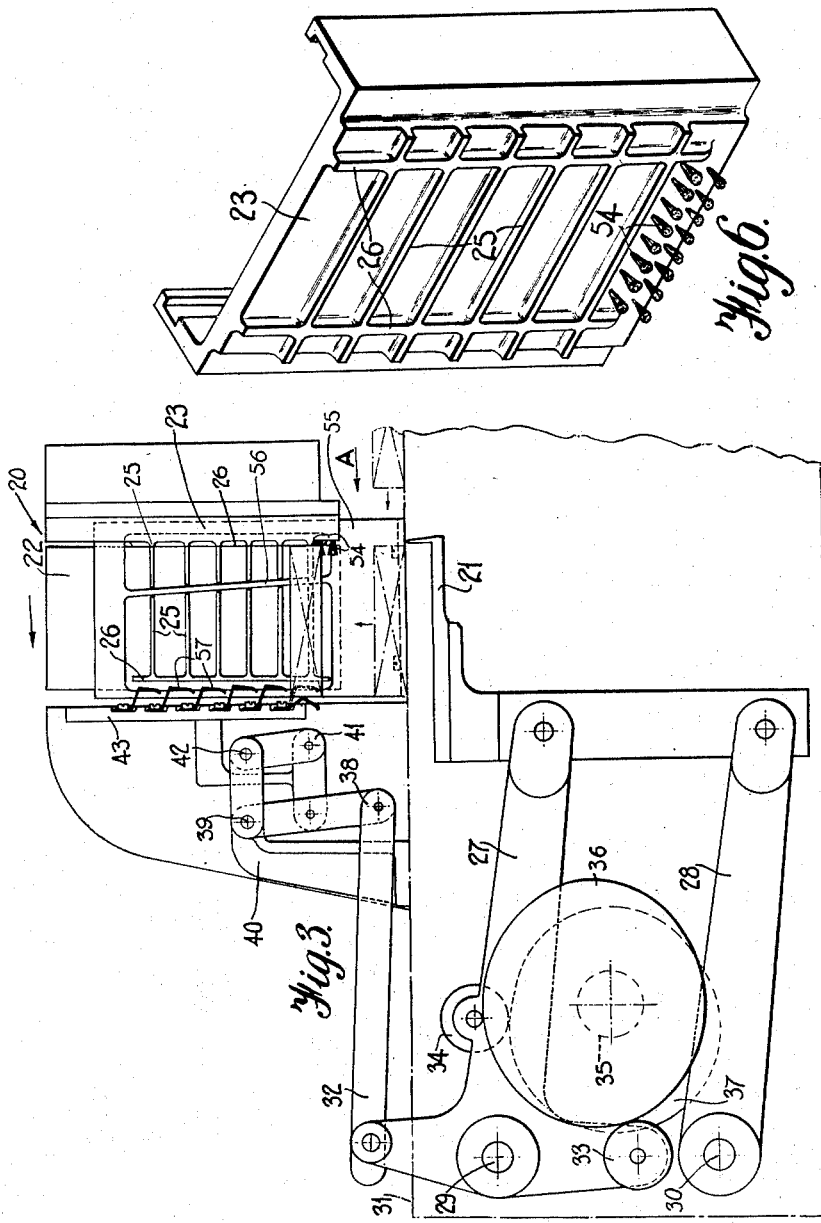
Figure 3 is a side elevation of part of a wrapping machine showing the heating devices for sealing a packet of the kind shown in Figure 2, one heater being omitted.
Figure 4:
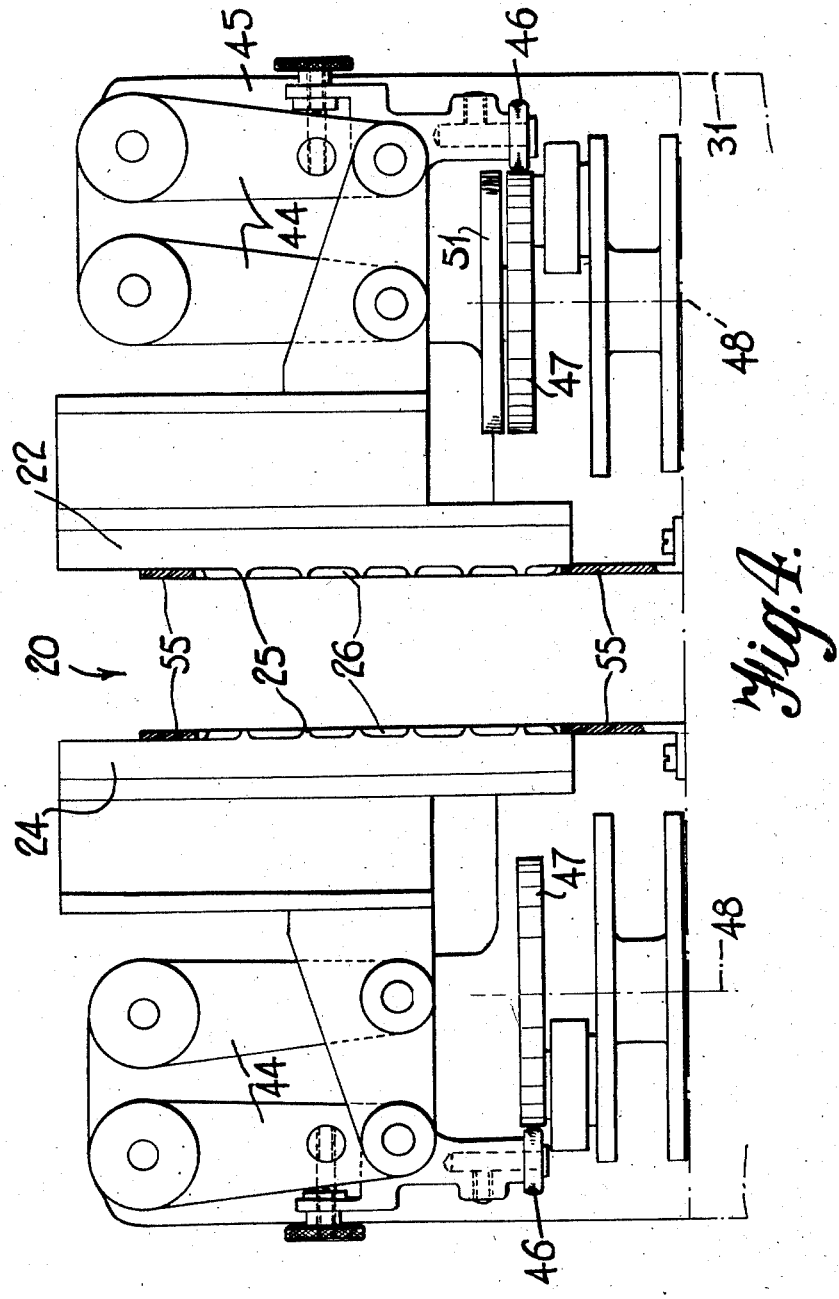
Figure 4 is an end elevation of Figure 3 looking in the direction of the arrow A, parts being omitted.

When a packet reaches the top of the stack it is removed therefrom in the direction indicated by the arrow; Figure 3.

The means for intermittently moving the stack upwards is so arranged as to move the stack exactly the same distance for each stroke. However, as explained above, slight variations may sometimes occur in the dimensions of the packets, and accordingly the height of the stack may vary very slightly from time to time. Thus the register of the bars with the wrappers may occasionally be unavoidably imperfect, but, as already stated, since the stack is a short one such slight variations are not material. Further slight variations in the positioning of the wrapping material may sometimes cause the heated surfaces to engage slightly off register. However, this is a discrepancy and preferably steps should be taken to reduce this or other mis-registration by making the packets accurately to size as far as reasonably practicable.

Preferably the heated surfaces engage only overlapping portions of the wrapping material so as to avoid heating single layers of material for the reason given above. When two or more layers are sealed together, the permeability of each is increased, but the resulting permeability of the combined layers is about the same as that of the rest of the wrapper, or not much greater. In practice it is not always possible, for the reasons explained above, to avoid occasional contact between a part of a heated surface and a single layer of material although it is desirable to avoid this as far as possible. If the areas of the wrapper so affected are small relatively to the total area of wrapper sealed, the permeability of the wrapper as a whole is not greatly increased and thus an advantage is still obtained.

Figure 5:
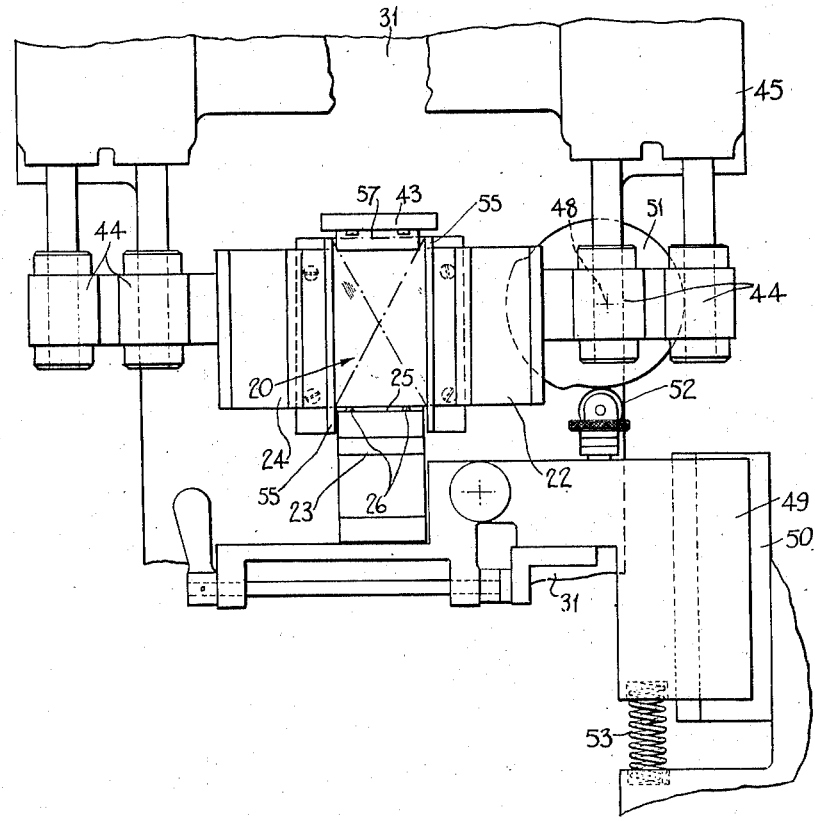
Figure 5 is a plan of Figure 4.

In order to prevent the stack from losing its alignment when the walls of the stacker move apart, guide plates 55 are provided which constitute permanent walls for the width of the stacker. These are fixed to the bed 31 and perforated as shown in Figures 3 and 5 so that the bars 25 and 26 on heaters 22 and 24 may move through the spaces and contact with the packet seams. As the bars 25 are required to heat a seam extending across the whole width of the heaters in question the plates 55 are provided with a guide strip 56 extending from the top to the bottom of the aperture in the plate and the bars 25 are recessed to allow space for this strip. It will be seen that if the strip 56 is vertically disposed the recesses in the bars 25 would be in a vertical line and thus a part of the seam 10, Figure 2, would not be heated. To overcome this difficulty the guide strip 56 is arranged obliquely and thus a part of the seam not contacting a heater bar at one level will be heated slightly higher up and satisfactory sealing is obtained.

Where the packets comprise a sliding member, such as the slide of the slide and shell cartons in which cigarettes are often packed, it is usual to provide means for pressing the slide towards the end of the packet where the wrapper seam is being sealed. In the present construction the means comprises springs 57 on the wall 43 as shown in Figure 3. As the wall 43 moves away from a packet when the latter is moving upwards the packet deflects the spring as shown in the figure where the lowest spring is in this condition. The wall then moves in and the spring exerts its full force on the slide and presses it in so that its other end is flush with the edges of the shell and a smooth wrapper seam is obtained.

What I claim as my invention and desire to secure by Letters Patent is:

1. A method of sealing a cellulosic wrapper made of heat-sealing cellulosic material of a kind such that its permeability to moisture is increased by the application of heat to the material, folded about an article of rectangular block shape, wherein the wrapper is folded about one end face and two opposed faces of the article and edge portions of the wrapper extending beyond the said three faces are folded down on two opposed side faces extending between said opposed faces so that the edge portions extending beyond said end face form end tucks, and the edge portions extending beyond said opposed faces form side flaps over said end tucks while the remaining end face of the article is covered by end tucks and end flaps over said tucks formed by folding end portions of the wrapper extending from said opposed side faces and opposed faces, which includes the step of applying heat sufficient to fuse overlapping portions of the wrapping material over an area along the length of each opposed side face extending to the end thereof adjacent the said remaining end face, and across the width of each side face substantially only over areas where the side folds overlap one another and also lie over the end tucks, and over an area along the whole length of the said remaining end face, and across the width of the said remaining end face substantially only over areas where the end flaps overlap one another and also lie over the end tucks the heat being applied to said areas by causing heated elements to engage portions of the wrapper lying within said areas, and during the whole of such engagements maintaining the said elements and the said portions of the wrapper stationary relatively to one another.

2. A method of heat sealing a wrapper, made from heat-sealing cellulosic material of a kind such that its permeability to moisture is increased by the application of heat to the material, on a flat face of an article of rectangular block shape, said wrapper having on said face a lap constituted by two overlapping side folds of the wrapper extending from opposite sides of the article, and a second lap constituted by both the said side folds and by a further fold in the form of an end tuck extending from an end face of the article and formed to both the said side folds, which includes the step, effected for the purpose of sealing the wrapper while avoiding undue increase in the permeability of the wrapping material due to the application of heat, of applying heat to the laps by causing at least one heated surface to engage the wrapper so as to form two conjoined seams transverse to one another, one of said seams being formed along the first said lap to seal the latter, and clear of the edges of the said lap, and the other of said seams being formed on the said second lap to seal it and extending from one of the said opposite faces to the other and narrower than the said second lap, and maintaining the said heated surface stationary relatively to the parts of the wrapper engaged thereby during the whole of such engagement so as to avoid sliding contact between the wrapping material and the heated surface.

3. A method of sealing as claimed in claim 2, wherein the said further fold comprises a third lap formed by two overlapping folds, and wherein heat is applied to form a seam along said third lap to seal it, and clear of its sides.

4. A method as claimed in claim 3, wherein the first and third said seams are each a continuation of one another.

5. Apparatus for sealing wrappers made from heat-sealing cellulosic material, comprising a plurality of movable heated elements, each of which comprises a regular pattern of conjoined relatively narrow striplike heated surfaces arranged transversely to one another, and suitable to engage the ends at least one of a stack of wrapped articles, means to move a stack of wrapped articles intermittently past said heated elements, in such manner that at each intermittent movement a succeeding article is moved to the position previously occupied by a preceding article, and means driven in timed relation to said first means to move said heated surfaces intermittently toward and away from the stack so as to engage and move away from wrappers of articles in the stack and to engage the wrappers only while the stack is stationary.

6. Apparatus as claimed in claim 5, wherein the heated surfaces are arranged to register with and engage simultaneously the wrappers of a plurality of articles in the stack, so that the wrapper of each of said plurality of articles is engaged by different heated surfaces in succession.

7. Apparatus as claimed in claim 6, wherein a plurality of groups of conjoined heated surfaces is provided on a heated element, said groups being spaced apart by appropriate distances in relation to the dimensions of the articles in the stack, the distance through which the stack is moved at each movement being such as to enable the said groups of conjoined heated surfaces to engage substantially the same parts of each wrapper in succession.

8. Apparatus as claimed in claim 7 wherein the said groups of conjoined heated surfaces are so spaced apart that the wrapper of each of said plurality of articles is engaged by each group of conjoined heated surfaces in succession.

9. Apparatus as claimed in claim 8, comprising fixed guides adapted to retain the stack in alignment when the heated surfaces move out of contact with the wrappers, said guides being each provided with a strip extending obliquely along the stack, said heated surfaces being cut away to provide recesses adapted to accommodate the oblique guide strips.

10. Apparatus as claimed in claim 9, comprising a plurality of springs, each arranged opposite a group of conjoined heated surfaces, and adapted to press on one side of the articles to provide an even surface at the other side of the articles where the wrapper is being sealed.

11. A method of sealing about articles wrappers made from heat-sealing cellulosic material, including the steps of folding the wrapping material about each article so that on one face of an article an edge portion of material lies over said face and is overlapped by a further edge portion of material which latter portion extends beyond the said face to form a projecting flap of the wrapper, arranging the articles so wrapped in a stack so that an edge portion of the projecting flap of one wrapper extends over and covers part of the wrapping material on the said face of an adjacent article in the stack, the articles being so arranged that the said faces form a side of the stack, and applying heat by means of a heated surface to a relatively narrow strip of the said overlapping portion of material on each said surface on that part only of said overlapping portion which is not covered by the projecting flap of the wrapper of an adjacent article, so that such projecting flaps are not engaged by a heated surface.

VALENTINE PEARCE HARVEY.

References Cited in the file of this patent

UNITED STATES PATENTS

| Number | Name | Date |
|---|---|---|
| 515,121 | Hunt | Feb. 20, 1894 |
| 1,673,524 | Molins | June 12, 1928 |
| 1,924,045 | Molins et al. | Aug. 22, 1933 |
| 2,036,873 | Jareckie | Apr. 7, 1936 |
| 2,170,364 | Bergstein | Aug. 22, 1939 |
| 2,289,618 | Young | July 14, 1942 |
| 2,362,819 | Hinckey | Nov. 14, 1944 |
| 2,453,889 | Bojanower | Nov. 16, 1948 |